United States Patent
Oral

(10) Patent No.: US 8,321,115 B2
(45) Date of Patent: Nov. 27, 2012

(54) TRACTION CONTROL SYSTEM USING TORQUE SENSOR FOR ADAPTIVE ENGINE THROTTLE CONTROL

(75) Inventor: Hamid A. Oral, Canton, MI (US)

(73) Assignee: Magna Powertrain of America, Inc., Troy, MI (US)

( * ) Notice: Subject to any disclaimer, the term of this patent is extended or adjusted under 35 U.S.C. 154(b) by 791 days.

(21) Appl. No.: 12/375,296

(22) PCT Filed: Aug. 10, 2007

(86) PCT No.: PCT/US2007/017788
§ 371 (c)(1),
(2), (4) Date: Jan. 27, 2009

(87) PCT Pub. No.: WO2008/024217
PCT Pub. Date: Feb. 28, 2008

(65) Prior Publication Data
US 2009/0240416 A1 Sep. 24, 2009

(51) Int. Cl.
*B60T 7/12* (2006.01)
(52) U.S. Cl. .......................................................... 701/85
(58) Field of Classification Search .................. 701/85; 180/197
See application file for complete search history.

(56) References Cited

U.S. PATENT DOCUMENTS

| 5,090,511 A | 2/1992 | Kabasin |
| 5,107,429 A | 4/1992 | Sol |
| 5,417,298 A * | 5/1995 | Shibahata ...................... 180/76 |
| 5,418,726 A | 5/1995 | Yagi |
| 5,519,617 A | 5/1996 | Hughes et al. |
| 5,890,470 A * | 4/1999 | Woon et al. .................... 123/350 |
| 5,992,243 A * | 11/1999 | Leeper ....................... 73/862.31 |
| 6,061,622 A | 5/2000 | Probst |
| 7,363,138 B2 * | 4/2008 | Scelers et al. ................. 701/82 |
| 2002/0111248 A1 | 8/2002 | Schmid |
| 2002/0152987 A1 * | 10/2002 | Woolford et al. ............. 123/333 |
| 2003/0135320 A1 * | 7/2003 | Bellinger ...................... 701/103 |
| 2005/0080547 A1 | 4/2005 | Scelers et al. |

* cited by examiner

*Primary Examiner* — James Trammell
*Assistant Examiner* — Jerrah Edwards
(74) *Attorney, Agent, or Firm* — Harness, Dickey & Pierce, P.L.C.

(57) ABSTRACT

A system and method using a vehicle drive shaft torque coupled to a driven wheel and a non-driven wheel speed for a vehicle throttle control system includes reading first and second torque values generated by the torque sensor. The method identifies when a sustained drop occurs between the first and second torque values. Another step determines if a change occurred between the first and second torque value readings in any of: a throttle position; a gear setting; and a brake pressure. A detected traction loss is signaled when the sustained drop occurred with no change between the first and second torque value readings in the throttle position, gear setting, and brake pressure. A desired throttle value is calculated using an engine torque and a target engine speed to prevent driven wheel slip. A throttle command signal changes an existing throttle value to the desired throttle value.

6 Claims, 9 Drawing Sheets

TRACTION CONTROL SYSTEM USING TORQUE SENSOR FOR ADAPTIVE ENGINE THROTTLE CONTROL

CROSS-REFERENCE TO RELATED APPLICATIONS

This application is a National Stage of International Application No. PCT/US2007/017788, filed Aug. 10, 2007, which claims the benefit of U.S. provisional application No. 60/839,053 filed Aug. 21, 2006.

FIELD

The present disclosure relates to a method and system for controlling an engine throttle using feedback signals from a torque sensor.

BACKGROUND

The statements in this section merely provide background information related to the present disclosure and may not constitute prior art.

Loss of traction between a road surface and a tire can occur during acceleration or deceleration. In both cases the available traction force between the tire and the road surface falls below a threshold capacity which is required to maintain the vehicle on a desired course and speed. Loss of traction force can also occur when a vehicle traveling at constant throttle encounters a sudden drop in friction coefficient of the road surface, which can cause wheel slip unless the engine controller proactively cuts the throttle. A delay of as little as a tenth of a second in determining the onset of traction loss without correction in a throttle setting can result in loss of vehicle control. Algorithms are therefore commonly used to calculate corrections for vehicle control. Due to the availability of speed sensors, most algorithms for throttle control rely mainly on speed information to determine wheel slip to take a follow-up action. Because of the highly non-linear relationship between the throttle input and the resultant wheel speed, convoluted algorithms are used to determine the throttle action for any given slip condition.

Attempts have been made to model systems and estimate several quantities such as torque and desired throttle position to reduce the complexity of the algorithms used, however algorithms generally cannot calculate exact torque values for all conditions. Known models therefore estimate torque and apply ground/wheel friction coefficients that are saved in tables of data. Because the tables of data are themselves empirical or estimations the data may not be responsive to rapidly changing conditions or determination of potential loss of traction at very early stages.

SUMMARY

According to several embodiments of a traction control system using torque sensor for adaptive engine throttle control of the present disclosure, a ground vehicle torque sensor based throttle control system includes a drive train including a power unit connected to a transmission. A plurality of wheels are included, at least a first one of the wheels defining a driven wheel in response to a drive torque transmitted through the transmission, and at least a second one of the wheels defining a non-driven wheel. At least one torque sensor is connected to the drive train operable to produce a traction torque signal. A speed sensor signals a wheel speed of the non-driven wheel. A throttle control signal is interpolated from a comparison of the traction torque signal to the non-driven wheel speed.

According to further embodiments, a method for operating a ground vehicle using a torque sensor based throttle control system is provided. The vehicle has a power unit connected to a transmission, a plurality of wheels, at least a first one of the wheels defining a driven wheel in response to a drive torque produced by the power unit, and at least a second one of the wheels defining a non-driven wheel, at least one torque sensor, and a speed sensor. The method includes producing a traction torque signal by the torque sensor in response to the drive torque. The method further includes generating a wheel speed signal by the speed sensor representing a rotational speed of the non-driven wheel. A throttle control signal is created by a comparison of the traction torque signal to the rotational speed of the non-driven wheel. The throttle control signal is used to adjust a throttle position when the traction torque signal indicates a driven wheel slip condition.

According to still further embodiments, a method is provided for using a rotational torque of a vehicle drive shaft coupled to a driven wheel together with a wheel speed of a non-driven wheel for a vehicle throttle control system. The method includes reading first and second torque values generated by the torque sensor. The method further includes identifying if a sustained drop has occurred between the first to the second torque values. The method still further includes determining if a change occurred between the first and second torque value readings in any of: a throttle position; a gear setting; and a brake pressure. A detected traction loss is signaled when the sustained drop occurred with no change between the first and second torque value readings in any of the throttle position, the gear setting, and the brake pressure. A desired throttle value is then calculated using an engine torque and a target engine speed operable to prevent wheel slip of the driven wheel. The method also includes sending a throttle command signal operable to change an existing throttle value to the desired throttle value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
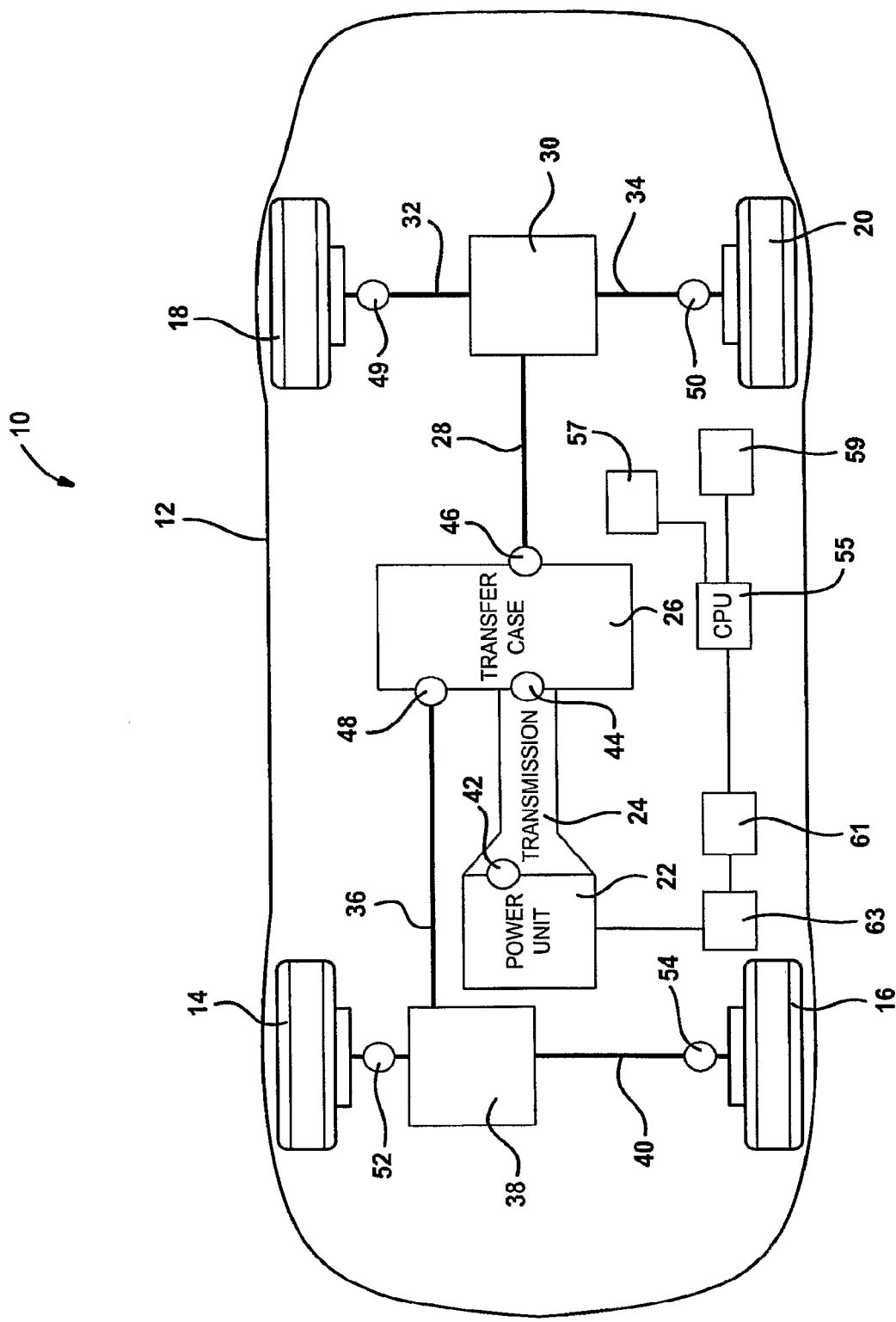
FIG. 1 is a bottom plan view of a vehicle having a traction control system using torque sensor for adaptive engine throttle control of the present disclosure.

The following description is merely exemplary in nature and is not intended to limit the present disclosure, application, or uses. It should be understood that throughout the drawings, corresponding reference numerals indicate like or corresponding parts and features.

According to a traction control system using torque sensor for adaptive engine throttle control of the present disclosure and referring generally to FIG. 1, a traction control system 10 is provided with a vehicle 12 such as an automobile, a truck, a bus or similar ground vehicle. Vehicle 12 includes each of first and second steerable wheels 14, 16 and each of first and second rear wheels 18, 20. Vehicle 12 is powered by a power unit 22 such as a combustion engine which can direct a drive torque through a transmission 24. One embodiment is described in reference to a combustion engine and transmission, however, any type of power source producing a drive torque can be used including but not limited to an electric motor or a fuel cell without departing from the scope of the present disclosure. It is also anticipated that the function or use of a transmission can be replaced by speed changing devices used in conjunction with an electric motor (such as a voltage step device acting to change motor speed or an alternate winding) or the transmission can be combined with the power unit providing a direct drive capability. A transmission as defined herein is therefore any device used to effect speed changes for the vehicle whether separate from or combined with the power unit. The term "engine" as used herein therefore broadly encompasses the above type of power units and "gear" includes the above speed changers. According to several embodiments, first and second rear wheels 18, 20 are driven by transmission 24.

According to several additional embodiments a transfer case 26 can be provided between transmission 24 and first and second rear wheels 18, 20. Transfer case 26 can provide an all wheel drive or a four wheel drive capability for vehicle 12 by transferring partial drive torque of power unit 22 to one or both first and second steerable wheels 14, 16. Drive torque from power unit 22 is transferred through transfer case 26 (when used) or directly from transmission 24 via a prop shaft 28 to a rear differential 30. From rear differential 30, rotational drive is provided to one or both of first and second rear wheels 18, 20 via a first rear half shaft 32 and a second rear half shaft 34 respectively.

Where transfer case 26 is used, power can also be transferred to rotate one or both of first and second steerable wheels 14, 16 via a front prop shaft 36 which can rotatably connect to a power transfer device 38. From power transfer device 38, rotational torque is provided to one or both of first steerable wheel 14 and to second steerable wheel 16 via a front drive shaft 40. A second half shaft can also be positioned between power transfer device 38 and first steerable wheel 14.

At least one and according to several embodiments, a plurality of torque sensors are provided with vehicle 12 whose outputs are connected into a controller such as central processing unit (CPU) 55 of traction control system 10. The plurality of torque sensors can include each of a power unit torque sensor 42, a transfer case interior torque sensor 44, a transfer case/transmission output torque sensor 46, a transfer case front output torque sensor 48, first and second rear wheel torque sensors 49, 50, and each of a first and second steerable wheel torque sensor 52, 54. Traction control system 10 can use any or different ones of the various torque sensors 42 through 54 depending on the type of drive train components used in vehicle 12. For example, use of torque sensors 49 and 50 can be used to determine apportioned drive torque from rear differential 30 to first and second rear wheels 18, 20 using for example a limited slip differential.

Figure 2:
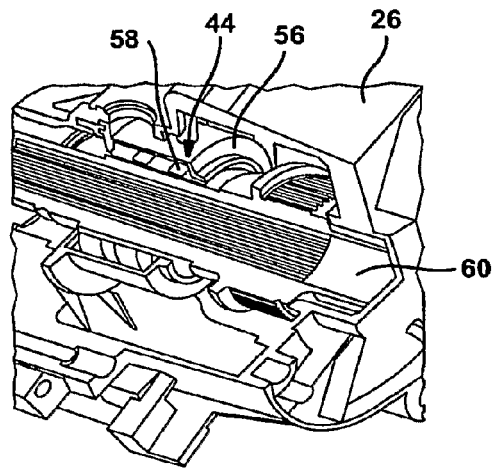
FIG. 2 is a side perspective view of a transfer case having an internally mounted torque sensor of the present disclosure.

Referring now generally to FIG. 2, transfer case interior torque sensor 44 is shown in greater detail positioned entirely within transfer case 26. Transfer case interior torque sensor 44 is positioned within a cavity of transfer case 26 and is sealed from contamination using a torque sensor casing 56. Torque sensor casing 56 can be made of a metal such as steel or aluminum, or from a polymeric material adapted for the temperatures associated with transfer case 26. Torque sensor casing 56 encloses at least one and in several embodiments a plurality of sensor windings 58. Sensor windings 58 encircle an output shaft 60 which connects to prop shaft 28 to provide drive torque to rear differential 30.

Figure 3:
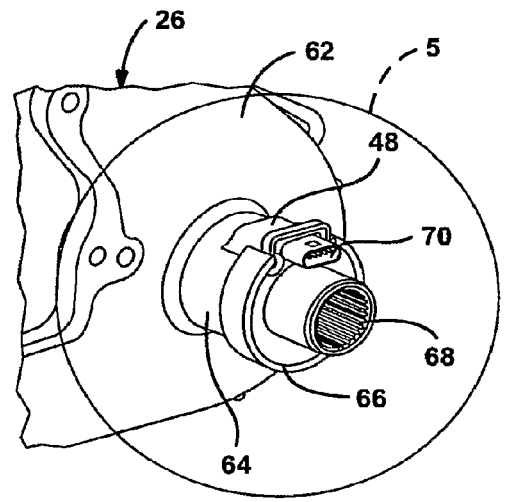
FIG. 3 is a front perspective view of a front casing connection for an externally mounted torque sensor for a transfer case font output shaft.
Figure 4:
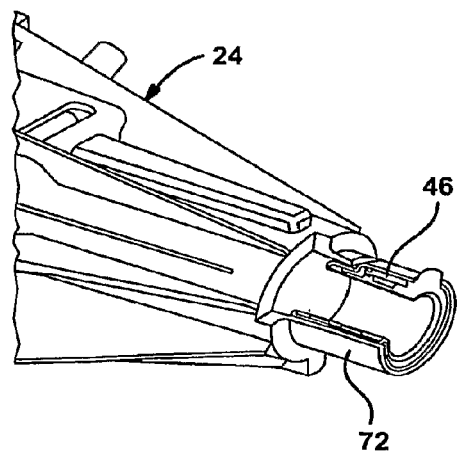
FIG. 4 is a rear perspective view of a transmission casing connection for an externally mounted torque sensor for a transmission output shaft.

Referring now to FIG. 3, when transfer case 26 is used, transfer case 26 can include a front casing 62. Front casing 62 can further include a casing extension 64 having a tubular end 66. Transfer case front output torque sensor 48 is slidably positioned into both tubular end 66 and casing extension 64 and mechanically retained therein to prevent rotation of transfer case front output torque sensor 48. Transfer case front output torque sensor 48 similar to transfer case interior torque sensor 44 encircles a splined shaft 68 extending outwardly from front casing 62. Splined shaft 68 can be connected to front prop shaft 36. An electrical connector 70 extends outwardly from torque sensor 48 and provides plug-in capability for an adapter wiring harness (not shown) which electrically connects the output of torque sensor 48 to CPU 55.

According to several additional embodiments of the present disclosure, a torque sensor can be externally mounted to transmission 24. In the example shown, transfer case/transmission output torque sensor 46 is slidably received within and retained by an output shaft extension tube 72 of transmission 24. A drive shaft (not shown) such as a splined shaft extends through output torque sensor 46 and outwardly from transmission 24 and is connected to prop shaft 28.

Figure 5:
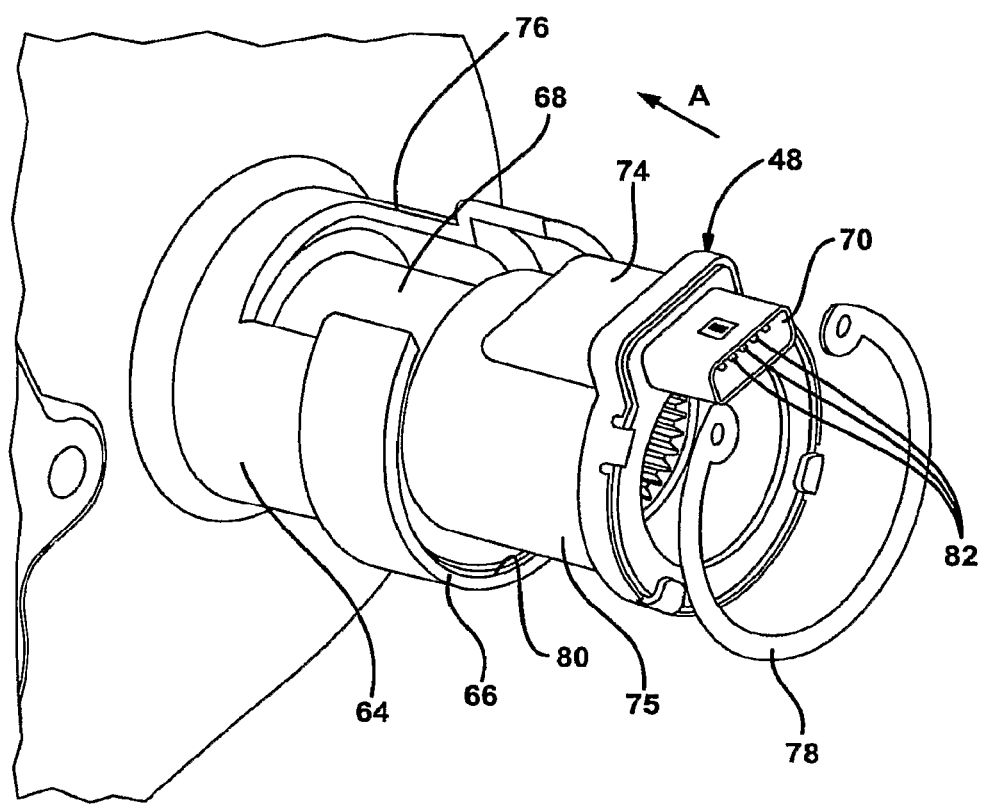
FIG. 5 is the front perspective view taken at area 5 of FIG. 3.

Referring now generally to FIG. 5, transfer case front output torque sensor 48 is shown in greater detail as it is installed with respect to casing extension 64. Splined shaft 68 extends outwardly from tubular end 66 and torque sensor 48 is slidably disposed over splined shaft 68 in an installation direction "A". A raised portion 74 is created in a torque sensor housing 75 which receives torque sensor 48. An open-ended slot 76 is created in each of casing extension 64 and tubular end 66. The geometry of open-ended slot 76 closely matches that of raised portion 74 so that when raised portion 74 is inserted into open-ended slot 76 torque sensor housing sensor 75 is prevented from rotation as splined shaft 68 rotates. When raised portion 74 is fully seated within open-ended slot 76, a fastener 78 such as a C-clip is engaged within a clip groove 80 of tubular end 66 to retain torque sensor housing 75 and thereby torque sensor 48. A plurality of connector pins 82 are provided within electrical connector 70. Connector pins 82 provide sensor output data to CPU 55 (shown in FIG. 1).

Figure 6:
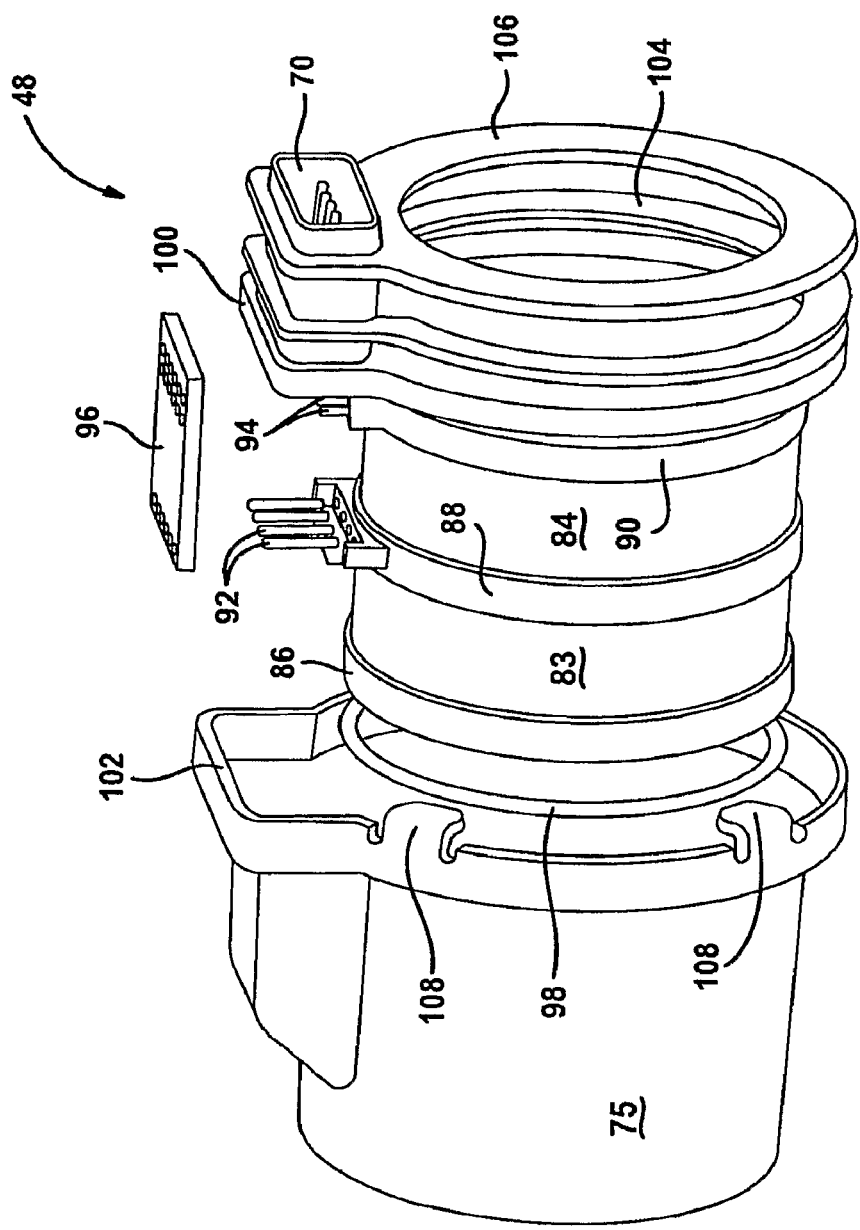
FIG. 6 is a side perspective assembly view of the front output torque sensor of FIG. 3.

Referring next to FIG. 6, torque sensor 48 includes first and second sensor windings 83, 84 which are coiled or wound about an insulating shaft 86. First and second sensor windings 83, 84 are spatially separated by a spacer element 88 homogenously connected to and extending radially outward from insulating shaft 86. A second spacer element 90 similarly extends radially outward from insulating shaft 86 to further contain second sensor winding 84. A plurality of first winding connection pins 92 extend from spacer element 88 and are electrically connected to first sensor winding 83. A plurality of second winding connection pins 94 are similarly provided extending radially outward from second spacer element 90 and electrically connected to second sensor winding 84. An electronic circuit board 96 having a plurality of apertures is aligned with and receives individual ones of the first and second winding connection pins 92, 94. Electronic circuit board 96 is subsequently electrically connected to connector pins 82 of electrical connector 70.

To help seal torque sensor 48 within torque sensor housing 75, a gasket 98 such as an O-ring is connected at insulating shaft 86 proximate first sensor winding 83. When torque sensor 48 is fully inserted into torque sensor housing 75, gasket 98 defines a circumferential seal at an end of torque sensor housing 75. To seal an opposite end of torque sensor 48 within torque sensor housing 75, an electronics housing 100 having substantially rectangular shaped outer perimeter walls is slidably received with a housing extension 102 of torque sensor housing 75 which is dimensionally adapted to closely receive and prevent rotation of electronics housing 100. To further seal the otherwise open end of torque sensor housing 75, a seal ring 104 is positioned at electronics housing 100 and a seal plate 106 is inserted over electrical connector 70 and against seal ring 104. A plurality of engagement elements 108 are deflected to engage seal plate 106 and prevent release of torque sensor 48. Material for gasket 98 and seal ring 104 can be an elastomeric material such as Buna-N, rubber, silicone rubber, and the like.

Figure 7:
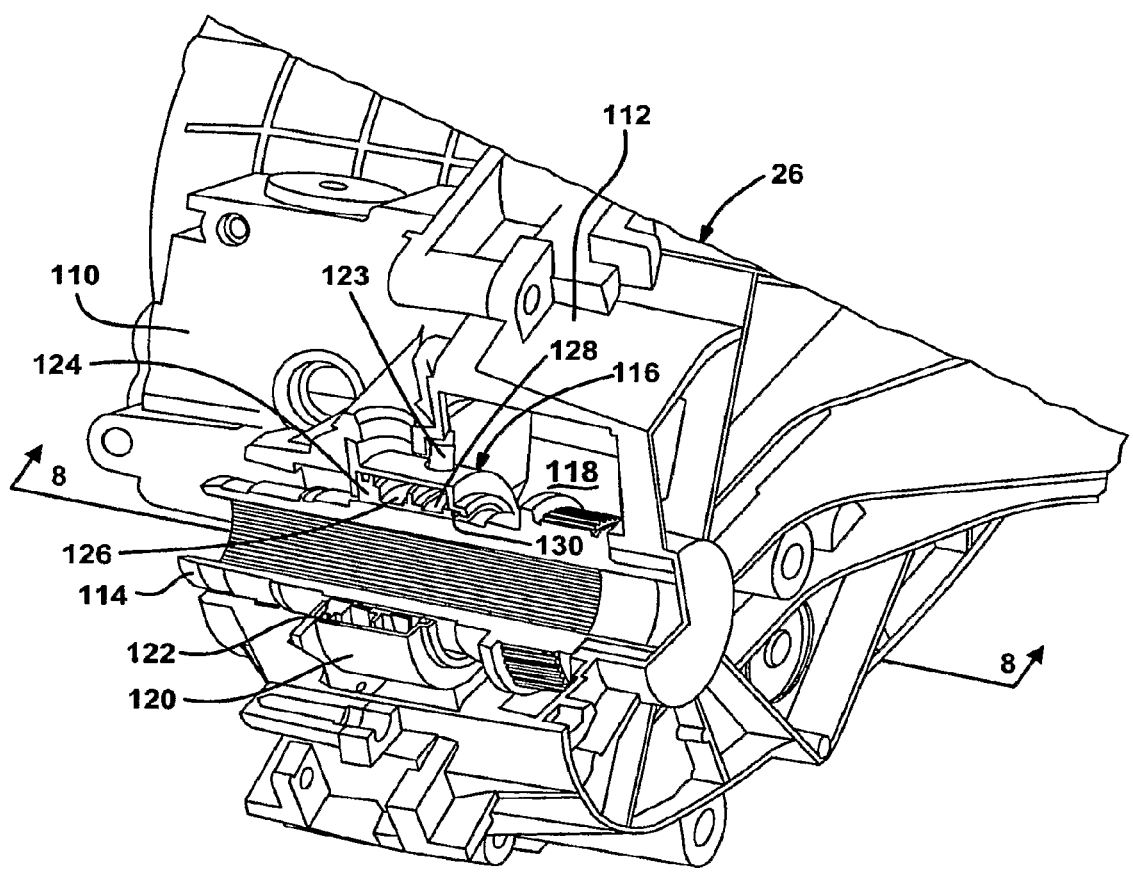
FIG. 7 is a partial cross-sectional perspective view of the transfer case of FIG. 1.

Referring now to FIG. 7, a portion of transfer case 26 is shown including each of a case first portion 110 and a case second portion 112 fastenably connected to case first portion 110. A drive shaft 114 is rotatably disposed within each of case first and second portions 110, 112. An enclosed torque sensor housing 116 is positioned entirely within a cavity 118 of transfer case 26. Torque sensor housing 116 can include a housing portion 120 and a cover portion 122. A wiring sleeve 123 can also be provided extending from housing portion 120. Wiring sleeve 123 contains a plurality of electrical wires for electrical connection to CPU 55 (shown in FIG. 1). An insulation sleeve 124 similar in function to insulating shaft 86 is positioned about a circumference of drive shaft 114.

Coiled about insulation sleeve 124 is each of a first sensor winding 126 and a second sensor winding 128 which function similar to first and second sensor windings 83, 84. To help prevent contamination of the first and second sensor windings 126, 128, a seal is created at a first end of torque sensor housing 116 using a first gasket 130. In several embodiments first gasket 130 is an O-ring.

Figure 8:
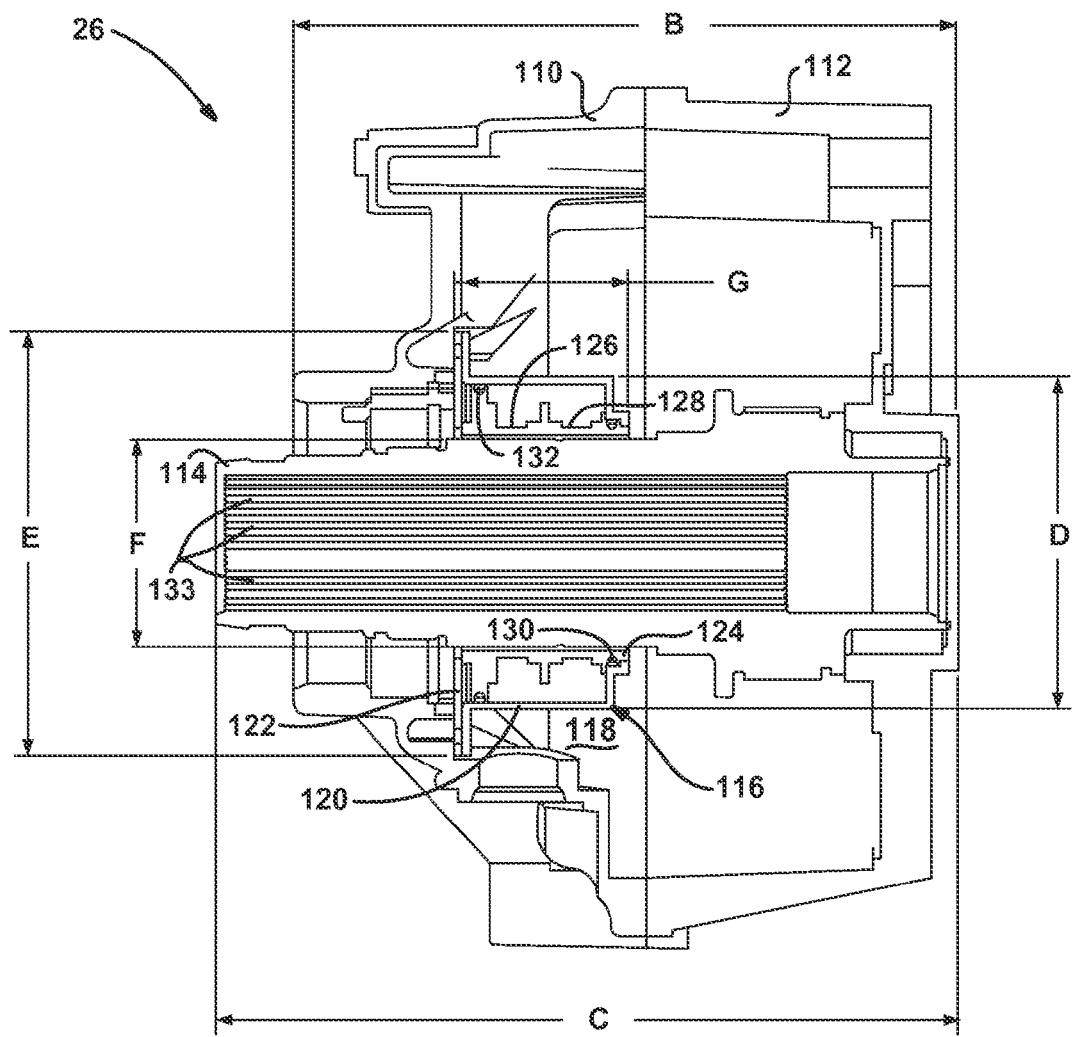
FIG. 8 is a side elevational cross-sectional view taken at section 8-8 of FIG. 7.

As best seen in reference to FIG. 8, in several embodiments a second gasket 132 is similar to the O-ring used for first gasket 130. Second gasket 132 is positioned at an opposite end of torque sensor housing 116 from the location of first gasket 130. First and second gaskets 130, 132 define resilient seal areas between an inner face of torque sensor housing 116 and insulation sleeve 124. Enclosed torque sensor housing 116 opens to a flanged end which abuts cover portion 122. Both the flanged end of torque sensor housing 116 and cover portion 122 can be fastenably connected to case first portion 110. A plurality of splines 133 are created throughout an internal cavity of drive shaft 114 which engage with corresponding splines (not shown) of front prop shaft 36.

A casing depth "B", a tool casing and shaft depth "C", a main housing diameter "D", a housing cover diameter "E", a shaft diameter "F", and a housing depth "G" are defined in FIG. 8. According to several embodiments of the present disclosure casing depth "B" is approximately 171.19 mm, total casing and shaft depth "C" is approximately 191.19 mm, main housing diameter "D" is approximately 86.50 mm, housing cover diameter "E" is approximately 110.00 mm, shaft diameter "F" is approximately 54.00 mm, and housing depth "G" is approximately 44.75 mm. The present disclosure is not limited to the dimensions provided above.

With further reference to FIG. 1, in several embodiments, and without limiting the disclosure to specific torque sensors or wheels, the power unit 22 is connected to the transmission 24. Of the plurality of wheels 14, 16, 18, 20, at least a first one of the wheels defines a driven wheel (for example first rear wheel 18) in response to a drive torque produced by the power unit 22. At least a second one of the wheels 14, 16, 18, 20 defines a non-driven wheel (for example first steerable wheel 14). At least one of the torque sensors 42, 44, 46, 48, 49, 50, 52, 54 produces a traction torque signal 57 in response to the drive torque. A speed sensor 59 signals a non-driven wheel speed $\omega_{nd}$ of the non-driven wheel (14) to CPU 55. A throttle control signal 61 is generated by the CPU 55 using the traction torque signal 57 and the non-driven wheel speed $\omega_{nd}$. The throttle control signal 61 is sent to a throttle control unit 63 which can adjust a throttle control position, ignition timing, fuel mixture, and the like of the power unit 22, which in turn changes the drive torque of the power unit 22 to mitigate wheel slip of the driven wheel (18).

Figure 9:
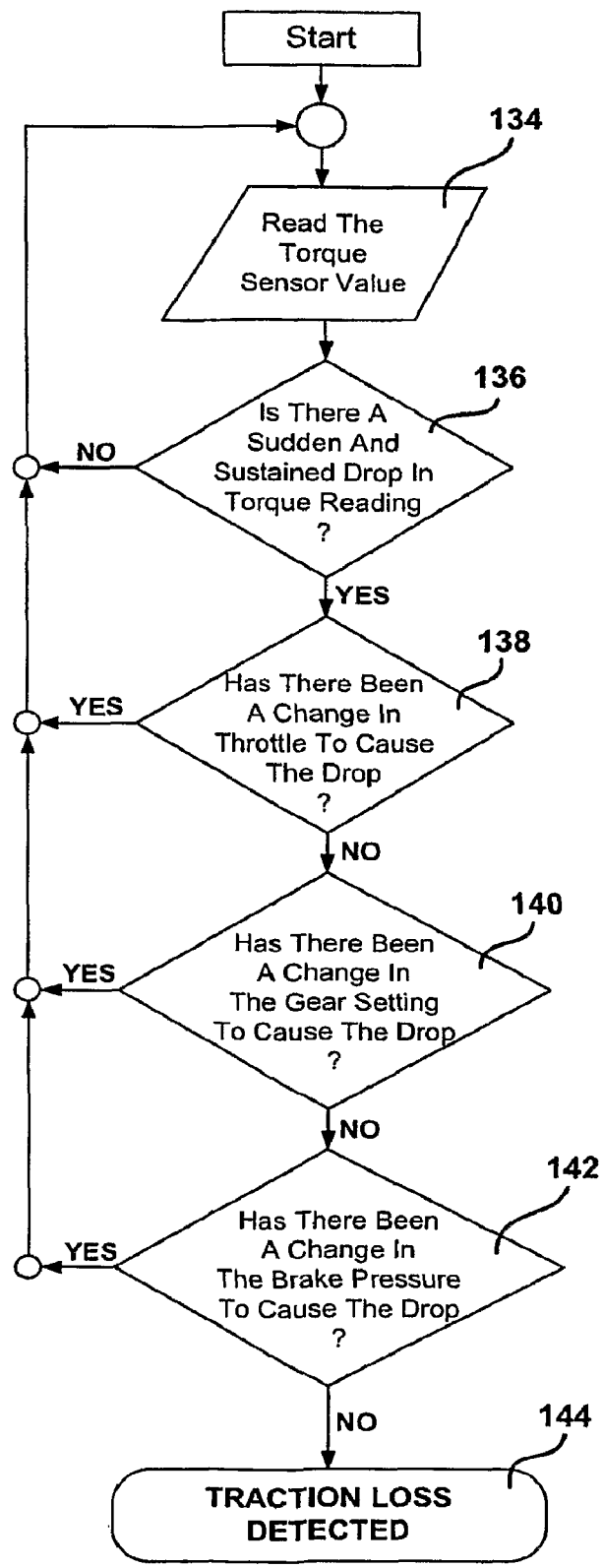
FIG. 9 is a decision flow diagram to determine if traction loss is detected for the system of the present disclosure.

Referring now to FIG. 9, a plurality of operations performed by traction control system 10 determine if a traction loss is detected for vehicle 12. In a sensor reading operation 134, the exemplary one of the plurality of torque sensors of the present disclosure is read and a torque sensor value obtained. The torque sensor value can be a voltage which is picked up as traction torque signal 57 (shown in FIG. 1) and can be further conditioned for use in CPU 55 or in a similar controller. The controller can be a stand alone unit or the algorithm can be integrated into another vehicle controller (not shown) which performs for example the transfer case control or transmission control, or the like. The torque sensor output can also be output as a current or a resistance change within the scope of the present disclosure. The controller or CPU 55 receives the torque signal or conditioned information and executes a calibration process to determine an actual torque value. Interchange of signal information can be conducted using a standard protocol such as Control Area Network (CAN).

Using the torque sensor value obtained in sensor reading operation 134, in a subsequent torque drop determining operation 136 a determination is made if a sudden and "sustained" drop in the torque reading has occurred. "Sustained" is herein defined as a drop occurring over approximately 3 to 5 ms. This time period is used to avoid sudden changes in the torque signal due to signal noise. The duration of signal noise is commonly approximately a single clock pulse. It is anticipated there will be events of greater than 5 ms duration required to restore traction torque such as but not limited to a vehicle encountering a pot hole. The control system and algorithm of the present disclosure continues to monitor the torque sensor output and reverses action taken for intermittent torque drop within a period of the throttle actuation and power train bandwidth. This approach allows a better use of critical time that is needed for avoidance rather than introducing artificial delay into a control loop of the system. Once the event is mitigated as specified herein adjustment of the throttle setting can be accomplished using known techniques. A rate of drop of the torque signal can also be used to provide a quicker or slower throttle response. For example, the sustained period can be varied as a function of a rate of the drop, which can range between 10% to 100% in a way that is inversely proportional to the rate of the drop. If no sudden and sustained drop in torque reading is determined the program returns to sensor reading operation 134.

If a sudden and sustained drop in torque reading is measured a throttle change determining operation 138 is performed. Throttle change determining operation 138 determinates if a change in throttle position has caused the sudden and sustained drop in the torque reading. If the torque reading change is attributable to a change in throttle, the program returns to the sensor reading operation 134. A separate throttle controller such as throttle control unit 63 (shown in FIG. 1) can either receive direct torque information or the torque value can be broadcast from another controller such as CPU 55.

If the sudden and sustained drop in torque reading is not attributable to a change in throttle, the program continues to a gear setting determining operation 140. Gear setting determining operation 140 determines if a change in a gear setting has caused the sudden and sustained drop in torque reading from torque drop determining operation 136. If a change in gear setting has caused the torque reading change, the program returns to sensor reading operation 134. Gear setting or gear change information is commonly available such as through the CAN or similar network. A separate transmission controller (not shown) can also be used which can provide the gear setting signal.

If a change in gear setting is not the cause for the sudden and sustained drop in torque reading, the program continues on to a brake pressure determining operation 142. This operation determines if there has been a change in brake pressure that caused the sudden and sustained drop in torque reading. If a change in brake pressure has caused the torque sensor reading to drop, the program returns to sensor reading operation 134. If a change in brake pressure is not the cause of the sudden sustained drop in torque reading, the program identifies that a traction loss event has occurred and produces a traction loss indication signal 144.

Figure 10:
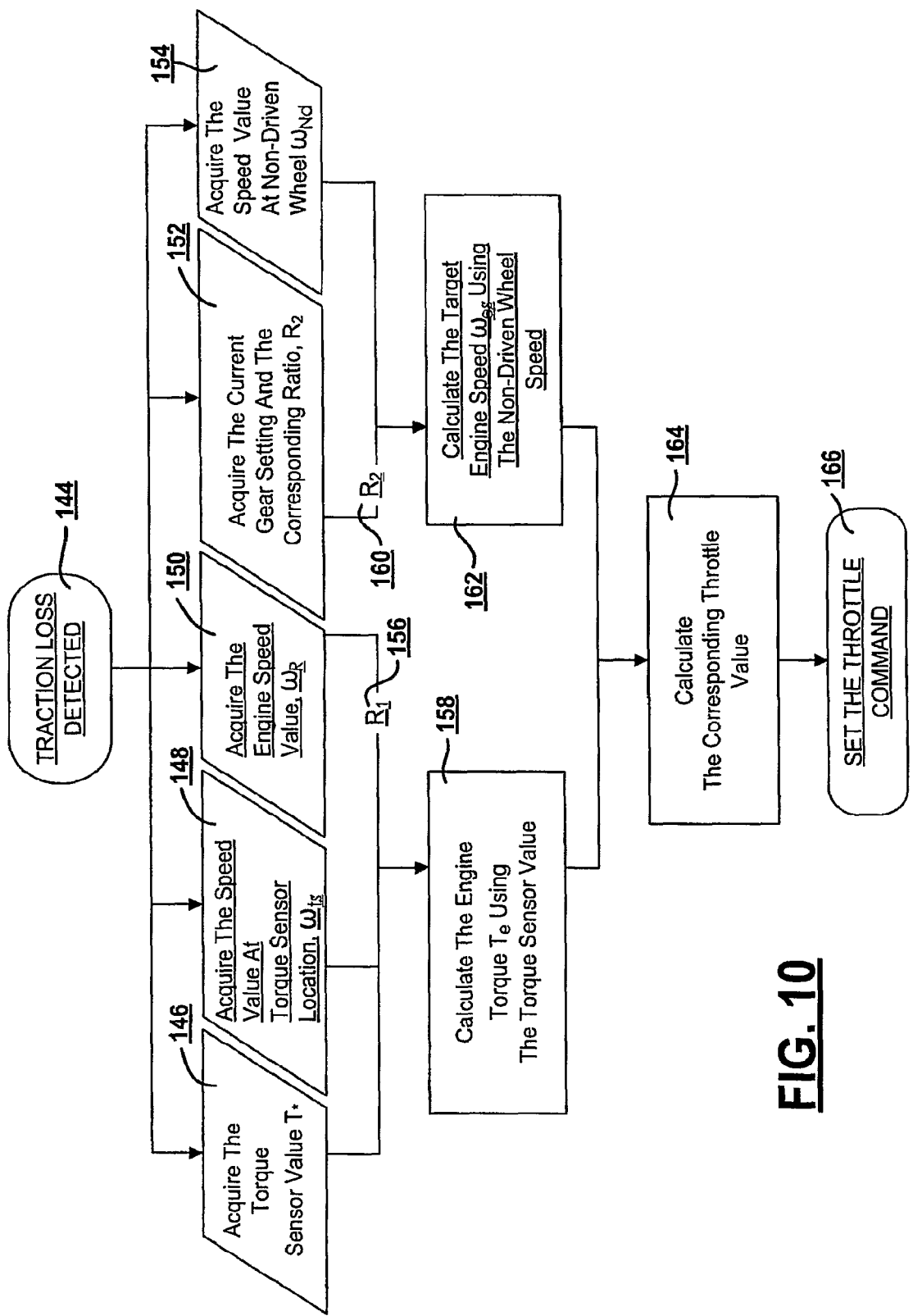
FIG. 10 is a function flow diagram to set the throttle command of the present disclosure.
Figure 11:
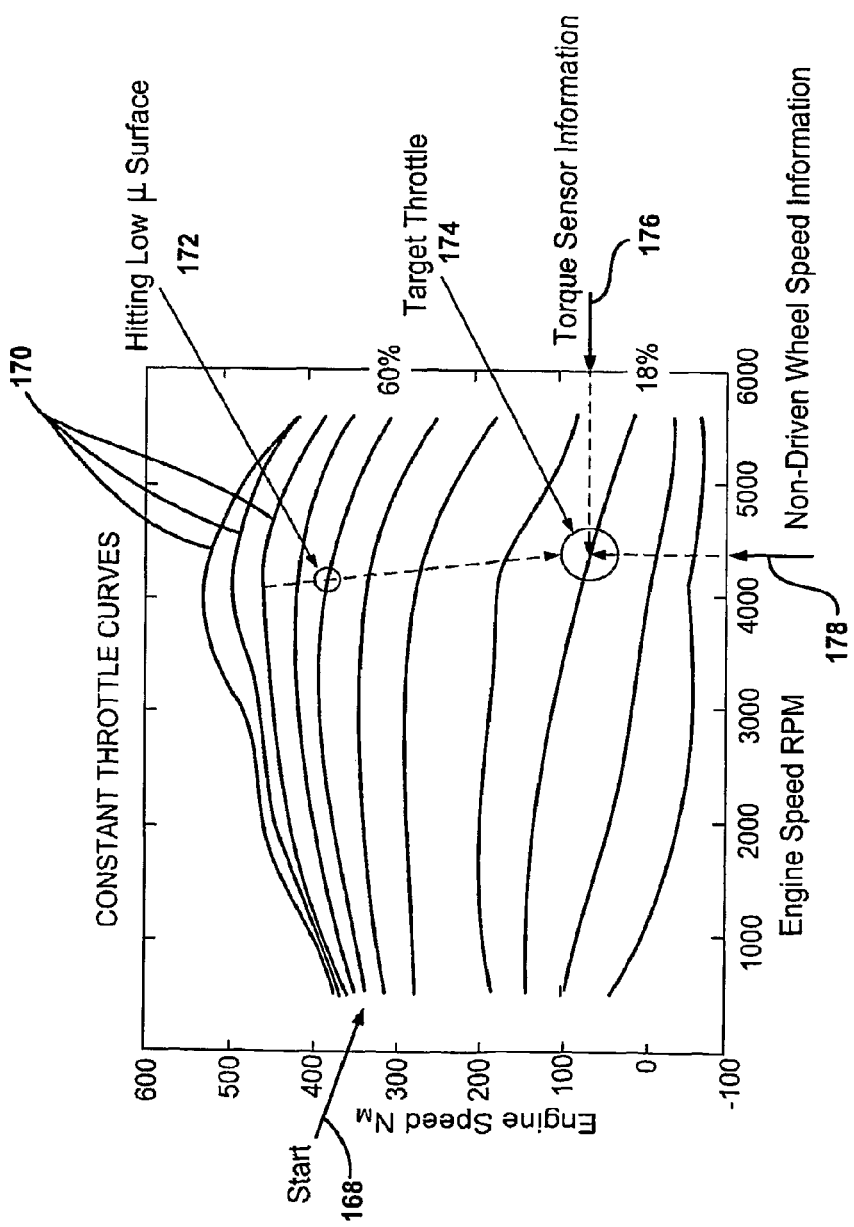
FIG. 11 is a graph of constant throttle curves plotted against engine torque and engine speed for determining a target throttle position using the traction control system of the present disclosure.

Referring now to FIGS. 10 and 11, once a traction loss event has been identified by traction loss indication signal 144 from FIG. 9, the algorithm via CPU 55 (or similar controller) performs a plurality of parallel acquisition steps. In a torque sensor value acquisition step 146 a torque sensor value T• is acquired. In a speed value acquisition step 148 a speed value $\omega_{ts}$ of the drive train component proximate the torque sensor location is calculated as described below. For example, a single torque sensor between the engine and the driven wheel is sufficient to implement the algorithm. When engine speed and the location of the sensor are known, the speed at the torque sensor location can be calculated, because the power train ratios are generally constant at given gear ratios.

In an engine speed value acquisition step 150 an engine speed value $\omega_R$ commonly represented by engine rpm is measured and therefore available. In a gear setting and ratio calculation step 152 the current gear setting is acquired and a ratio $R_2$ is already known due to the mechanical design of the drive train elements. A non-driven wheel speed value acquisition step 154 is then performed wherein a speed value at the non-driven wheel $\omega_{Nd}$ is acquired. To calculate the speed value $\omega_{ts}$ at the torque sensor location in acquisition step 148, a ratio $R_1$ is first determined in a step 156 where:

$$R_1 = \frac{\text{Torque Converter Torque Ratio} * \text{Gearbox Ratio} * \text{Final Drive Ratio}}{2}$$

The speed value $\omega_{ts}$ at the torque sensor location is then determined by the following equation:

$$\omega_{ts} = \omega_R/R_1 \quad \text{Equation 1}$$

wherein the torque converter ratio, the gearbox ratio, and the final drive ratio are known for a given power train.

For an exemplary situation when the transfer case clutch to the front axle is disengaged, using the results of equation 1, in a torque calculation step 158 an engine torque $T_e$ is calculated using the following equation:

$$T_e = T \cdot /R_1 \quad \text{Equation 2}$$

where the torque sensor value T• obtained in torque sensor value acquisition step 146 and ratio $R_1$ from Equation 1 are used.

Each of the values obtained in steps 152 and 154 and a ratio $R_2$ identified at step 160 are used to calculate in a speed calculation step 162 a target engine speed $\omega_{es}$ using the values of the non-driven wheel speed $\omega_{Nd}$ and the ratio $R_2$ according to the following equation:

$$\omega_{es} = R_2 * \omega_{Nd} \quad \text{Equation 3}$$

Assuming there is no ratio change between a transfer case output and the rear and front wheels, ratio $R_2$ is substantially equal to ratio $R_1$ since they are both ratios between the engine and the half-shaft when the torque sensor is located on the half-shaft. It will be evident that ratio $R_2$ can also differ from ratio $R_1$ when the torque sensor position varies.

The engine torque $T_e$ result obtained by engine torque calculation step 158, and the target engine speed $\omega_{es}$ obtained in target engine speed calculation step 162 are interpolated using table data of constant throttle curves in the exemplary table of FIG. 11 in a throttle value determination step 164. In step 164 the engine characteristics are used to calculate the corresponding target throttle value 174. The target throttle value 174 obtained by throttle value determination step 164 is used to provide a set throttle command 166 to set or reset the vehicle throttle position. In several embodiments each of the steps performed in FIGS. 9 and 10 to set or reset the throttle command can be performed in approximately 100 milliseconds or less which is sufficient to prevent loss of vehicle control.

Referring now more specifically to FIG. 11, a rapid response from traction control system 10 is provided for an exemplary set of data. It will be evident that each vehicle or vehicle model having differing power unit output torques and different drive train configurations will have a predetermined graph similar to FIG. 11. FIG. 11 identifies a start point 168 which signifies initial acceleration of vehicle 12 at constant throttle. Vehicle 12 subsequently accelerates and shifts through a plurality of gears until vehicle power unit 22 reaches approximately 4,200 rpm. Torque oscillations of the power train during the plurality of shifts are ignored for FIG. 11. A plurality of constant throttle curves 170 are provided each signifying approximately a 10 percent change from 10 percent throttle up to approximately 100 percent throttle. At a point 172 a start of a low friction event occurs. The low friction event can correspond to the vehicle encountering a travel surface having a significantly lower coefficient of friction than at start point 168. Upon encountering the low coefficient of friction surface the torque sensor reading immediately begins to dip downward.

It is at this time that a correction in throttle setting is required to mitigate wheel spin (traction loss) and potential loss of vehicle control to maintain stability of vehicle 12. The corrective action includes identification of a critical throttle value that corresponds to a traction torque of the non-driven wheel speed $\omega_{Nd}$ of vehicle 12, provided for example in an engine map stored in CPU 55. The critical throttle value is the result obtained by throttle value determination step 164 of FIG. 10. The critical throttle value is used to set or reset the throttle command as rapidly as possible to maintain traction and vehicle control. Because the ratios of the power train are known, a target engine speed $\omega_{es}$ that corresponds to the non-driven wheel speed $\omega_{Nd}$ can be calculated. In another embodiment, an actual speed ratio $\omega_{ts}$ determined by comparing the drive train speed at the torque sensor to the engine speed $\omega_R$ of the power unit 22 can also be used to modify the measured torque sensor value T$\omega$. For this embodiment the two points, i.e., the critical throttle value and the actual speed ratio $\omega_{ts}$ together define what the throttle setting should be to maintain traction for vehicle 12.

Referring again to FIG. 11, after the start of the low friction event at point 172, the target throttle value 174 is determined where the combination of the torque sensor information from the torque sensor output identified as value 176 intercepts one of the constant throttle curves 170 at a point corresponding to the non-driven wheel speed End, in this example shown at position 178. The target throttle value 174 is then used by the algorithm to reset the throttle command to reduce engine speed at a new constant throttle curve (in the example shown at 18%) corresponding to a vehicle traction condition at the lower coefficient friction surface conditions identified at the start of the low friction event at point 172.

An algorithm is created to control operation of traction control system 10. A torque sensor reading is used to calculate an engine torque. The calculated engine torque and the calculated target engine speed are used to determine a throttle control action further using an engine torque-speed curve. A single torque sensor can be used in several applications of the present disclosure. In an exemplary front wheel drive vehicle, providing a single torque sensor positioned between the engine and the front wheels is sufficient to provide the torque sensor reading. In a rear wheel drive vehicle, providing a single torque sensor positioned between the engine and the rear wheels is sufficient to provide the torque sensor reading. In a four wheel drive vehicle, the torque sensor should be positioned with respect to the set of normally driven wheels. For example only, in a pickup truck having a transfer case with the rear wheels being the normally driven wheels and having a torque biasing clutch to distribute torque to the front wheels on demand, a sensor can be positioned on the powertrain between the engine and the rear wheels.

A torque sensor has a fundamental advantage compared to a speed sensor. The torque sensor measures a change in acceleration while the speed sensor measures a change in speed. The change in speed is the cumulative result of the change in acceleration. While the change in acceleration can occur within a very short time span, a change in speed occurs relatively more gradually. A control action is normally taken after the change exceeds a certain, normally predetermined threshold, therefore a control action which relies on a speed sensor measurement necessarily requires a delayed period to reach the threshold. A torque sensor however, provides a substantially immediate signal which provides a substantially immediate indication the threshold has been exceeded. The torque sensor system of the present disclosure therefore can both sense a slip condition faster and prepare the appropriate control action response faster following a traction loss condition than a speed sensor system.

The normal reaction of a driver who senses a loss of wheel traction is first to reduce the throttle. However, the response of a driver is commonly slower than the 3-5 ms sustained time period of the present system, which can lead to loss of vehicle control. The traction control system 10 of the present disclosure is therefore faster than either a system using speed sensors or the normal response time of a vehicle operator. The present disclosure can also provide for a partial reduction in the throttle setting which in some instances is a better response than the normal operator response to completely cut back on the throttle setting.

The traction control system 10 of the present disclosure provides several advantages. First, the system provides a rapid recognition that a low coefficient friction event is occurring. This recognition is made possible through the use of torque sensors which have a more rapid response time than velocity sensors typically used for this determination in other control systems. Second, a rapid response is provided by the traction control system 10 of the present disclosure. The traction control system of the present disclosure uses the torque sensor value to define the follow-up action required to maintain vehicle control and stability. Using the torque sensor value minimizes the task of previous adaptive algorithms and achieves an optimum or corrective throttle control value faster than known systems.

What is claimed is:

1. A method for using a rotational torque of a vehicle drive shaft coupled to a driven wheel together with a wheel speed of a non-driven wheel for a vehicle throttle control system, the method comprising:
    reading first and second torque values generated by a torque sensor;
    identifying that a sustained drop has occurred between the first and the second torque values for a period of time within the range of substantially 3 ms to 100 ms;
    determining if a change occurred between the first and second torque value readings in any of:
      a throttle position;
      a gear setting; and
      a brake pressure;
    signaling a detected traction loss when the sustained drop occurred with no change, between the first and second torque value readings, in any of the throttle position, the gear setting, and the brake pressure;
    calculating a desired throttle value using an engine torque and a target engine speed operable to prevent wheel slip of the driven wheel; and
    sending a throttle command signal operable to change an existing throttle value to the desired throttle value.

2. The method of claim 1, further comprising multiplying a value of the throttle command signal by a safety factor to maintain a throttle setting below a threshold value.

3. The method of claim 1, further comprising using a value of 0.8 as the safety factor.

4. A method for using a rotational torque of a vehicle drive shaft coupled to a driven wheel together with a wheel speed of a non-driven wheel for a vehicle throttle control system, the method comprising:
    reading first and second torque values generated by a torque sensor;
    identifying that a sustained drop has occurred between the first to and the second torque values for a period of time within the range of approximately 3 ms to 5 ms;
    determining if a change occurred between the first and second torque value readings in any of:

a throttle position;
a gear setting; and
a brake pressure;
signaling a detected traction loss when the sustained drop occurred with no change, between the first and second torque value readings, in any of the throttle position, the gear setting, and the brake pressure;
calculating a desired throttle value using an engine torque and a target engine speed operable to prevent wheel slip of the driven wheel; and sending a throttle command signal operable to change an existing throttle value to the desired throttle value.

5. The method of claim 4, further comprising multiplying a value of the throttle command signal by a safety factor to maintain a throttle setting below a threshold value.

6. The method of claim 4, further comprising using a value of 0.8 as the safety factor.

* * * * *